United States Patent
Fujii et al.

(10) Patent No.: US 10,811,042 B2
(45) Date of Patent: Oct. 20, 2020

(54) DISK DRIVE THERMALLY ASSISTED MAGNETIC RECORDING HEAD HAVING A SLIDER AND A TILTED LIGHT INCIDENT SURFACE

(71) Applicant: SAE Magnetics (H.K.) Ltd., Hong Kong (HK)

(72) Inventors: Ryuji Fujii, Hong Kong (HK); Jian Hui Huang, Dongguan (CN); Natsuo Nishijima, Hong Kong (HK); Lin Huang, Dongguan (CN); Shi Xiong Chen, Dongguan (CN); Bin Qi, Dongguan (CN); Wen Rong Guo, Dongguan (CN)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 0 days.

(21) Appl. No.: 16/231,628

(22) Filed: Dec. 24, 2018

(65) Prior Publication Data
US 2020/0143827 A1    May 7, 2020

(30) Foreign Application Priority Data
Nov. 2, 2018    (CN) .......................... 2018 1 1303168

(51) Int. Cl.
*G11B 5/31*    (2006.01)
*G11B 5/60*    (2006.01)
*G11B 5/48*    (2006.01)
*G11B 5/00*    (2006.01)

(52) U.S. Cl.
CPC ............ *G11B 5/4866* (2013.01); *G11B 5/314* (2013.01); *G11B 5/3133* (2013.01); *G11B 5/60* (2013.01); *G11B 5/6088* (2013.01); *G11B 2005/0021* (2013.01)

(58) Field of Classification Search
CPC ........ G11B 5/313; G11B 5/3133; G11B 5/314
USPC ........................................ 360/125.3, 125.31
See application file for complete search history.

(56) References Cited

U.S. PATENT DOCUMENTS

| | | | | |
|---|---|---|---|---|
| 8,243,561 B2* | 8/2012 | Matsumoto | ............ | G11B 5/105 360/59 |
| 8,406,089 B2* | 3/2013 | Sasaki | ................... | G11B 5/314 369/13.02 |
| 8,588,039 B1* | 11/2013 | Shi | ........................ | G11B 5/314 369/13.13 |
| 8,649,245 B2* | 2/2014 | Goulakov | .............. | B82Y 20/00 369/13.13 |

(Continued)

*Primary Examiner* — Jefferson A Evans

(57) ABSTRACT

A thermally assisted magnetic recording head and a thermally assisted magnetic recording disk drive are disclosed. The thermally assisted magnetic recording head includes a slider body, a laser substrate, a laser and a magnetic head, wherein the laser substrate is provided on the slider body, the laser is provided on the laser substrate, and the magnetic head is provided at a front end of the slider body. The magnetic head includes an optical waveguide facing the laser. The angle between a light incident surface of the optical waveguide and an incident direction of a laser light incident on the optical waveguide is less than 90 degrees. The thermally assisted magnetic recording disk drive includes a plurality of magnetic disks and a magnetic head suspending frame. A front end of the magnetic head suspending frame is provided with the thermally assisted magnetic recording heads mentioned above.

14 Claims, 7 Drawing Sheets

(56) References Cited

U.S. PATENT DOCUMENTS

| | | | | |
|---|---|---|---|---|
| 2009/0303858 A1* | 12/2009 | Kuiseko | ................ | B82Y 10/00 |
| | | | | 369/112.27 |
| 2011/0122736 A1* | 5/2011 | Park | ....................... | G11B 5/314 |
| | | | | 369/13.17 |
| 2011/0134740 A1* | 6/2011 | Sekine | ................... | G11B 5/314 |
| | | | | 369/100 |
| 2011/0216635 A1* | 9/2011 | Matsumoto | ............ | G11B 5/314 |
| | | | | 369/13.33 |
| 2012/0133769 A1* | 5/2012 | Nagamine | ................ | B60R 1/00 |
| | | | | 348/148 |
| 2012/0182842 A1* | 7/2012 | Iwanabe | ................ | G11B 5/314 |
| | | | | 369/13.17 |
| 2013/0250742 A1* | 9/2013 | Komura | ............... | G02B 6/4208 |
| | | | | 369/13.32 |
| 2014/0241137 A1* | 8/2014 | Jin | ....................... | G11B 5/4866 |
| | | | | 369/13.14 |
| 2014/0269236 A1* | 9/2014 | Kozlovsky | ........... | G11B 5/3109 |
| | | | | 369/13.24 |
| 2015/0016238 A1* | 1/2015 | Gubbins | .............. | G11B 5/4866 |
| | | | | 369/13.32 |
| 2015/0124575 A1* | 5/2015 | Sasaki | .................. | G11B 5/3133 |
| | | | | 369/13.33 |
| 2015/0294678 A1* | 10/2015 | Hara | .................... | G11B 5/6082 |
| | | | | 369/13.33 |

* cited by examiner

DISK DRIVE THERMALLY ASSISTED MAGNETIC RECORDING HEAD HAVING A SLIDER AND A TILTED LIGHT INCIDENT SURFACE

CROSS REFERENCE TO RELATED APPLICATIONS

The present application claims the benefit of Chinese Patent Application No. 201811303168.4 filed on Nov. 2, 2018, the contents of which are incorporated herein by reference in its entirety.

TECHNICAL FIELD

The present application relates to disk drive technology, and more specifically to a thermally assisted magnetic recording head and a thermally assisted magnetic recording disk drive.

BACKGROUND

In the past, the method of increasing magnetic recording density is to reduce the size of particles as much as possible. However, with the increase of storage density, it is found that the reduction of volume of particles is limited by superparamagnetic effect. When the size of recording bits is reduced, relaxation time of magnetic order decreases exponentially. The relaxation time of magnetic order decreases exponentially when the measured temperature of the recording bits increases. Therefore, reduction of the volume of the recording bits and increase of temperature will result in magnetic instability of the recording bits.

In order to break through the limit of magnetic recording density caused by the superparamagnetic effect, thermally assisted magnetic recording (TAMR) technology, which is also known in the art as heat assisted magnetic recording (HAMR), has been widely followed. The purpose of this technique is to effectively deal with the difficulty of writing with magnetic head micro field strength under ultra-high density storage, and to reduce the coercive force of the medium by using laser heating during the process of magnetic recording.

A thermally assisted magnetic recording disk drives includes a plurality of disks, a spindle motor for driving the disks to rotate, and a head stack assembly (HSA). The head stack assembly includes thermally assisted magnetic recording heads provided at a front end of the suspending arms. Referring to FIGS. 1 and 2, the existing thermally assisted magnetic recording head includes a slider body 1, a laser substrate 2 provided on the slider body 1, and a laser 3 provided on the laser substrate 2. A front end of the slider body 1 is provided with a magnetic head 4. The magnetic head 4 includes an optical waveguide 40. A light incident surface 41 of the optical waveguide 40 is facing the laser 3. The light incident surface 41 is a flat surface. That means the light incident surface 41 and the incident direction of the laser light emitting from the laser 3 are perpendicular to each other. Thus, a portion of the laser light emitting from the laser 3 is reflected back along the original path, causing laser emission instability and mode hopping. These undesirable effects will cause substantial increase in the error rate of the thermally assisted magnetic recording head, making the object of high density recording difficult to achieve.

SUMMARY

According to one aspect, an object of the present application is to provide a thermally assisted magnetic recording head which can improve laser emission instability and suppress mode hopping. The thermally assisted magnetic recording head includes a slider body, a laser substrate, a laser and a magnetic head. The laser substrate is provided on the slider body, the laser is provided on the laser substrate, and the magnetic head is provided at a front end of the slider body. The magnetic head includes an optical waveguide facing the laser. The angle between a light incident surface of the optical waveguide and an incident direction of a laser light incident on the optical waveguide is less than 90 degrees.

According to an embodiment of the thermally assisted magnetic recording head of the present application, the angle between the light incident surface and the incident direction may be 45~87 degrees.

According to an embodiment of the thermally assisted magnetic recording head of the present application, the angle between the light incident surface and the incident direction may be 82 degrees.

According to an embodiment of the thermally assisted magnetic recording head of the present application, the light incident surface may be formed by ion beam etching.

According to an embodiment of the thermally assisted magnetic recording head of the present application, the light incident surface may be formed by mechanical lapping.

According to an embodiment of the thermally assisted magnetic recording head of the present application, the light incident surface and an end face of a cladding of the optical waveguide may be disposed on a same plane.

According to an embodiment of the thermally assisted magnetic recording head of the present application, a normal direction of the light incident surface may be tilted forwards, backwards, leftwards, or rightwards relative to the incident direction.

According to another aspect, the present application further provides a thermally assisted magnetic recording disk drive having a plurality of magnetic disks and a magnetic head suspending frame. A front end of the magnetic head suspending frame may be provided with the thermally assisted magnetic recording heads as mentioned above.

The thermally assisted magnetic recording head of the present application has the following beneficial effects. In the thermally assisted magnetic recording head of the present application, the angle between the light incident surface of the optical waveguide and the incident direction may be less than 90 degrees. Thus, light reflected from the light incident surface will not go back to the laser along the incident direction. This can improve laser emission instability and suppress mode hopping.

BRIEF DESCRIPTION OF THE DRAWINGS

The present application will be further described with the combination of the following embodiments and the accompanying drawings, wherein.

DETAILED DESCRIPTION

Figure 1:
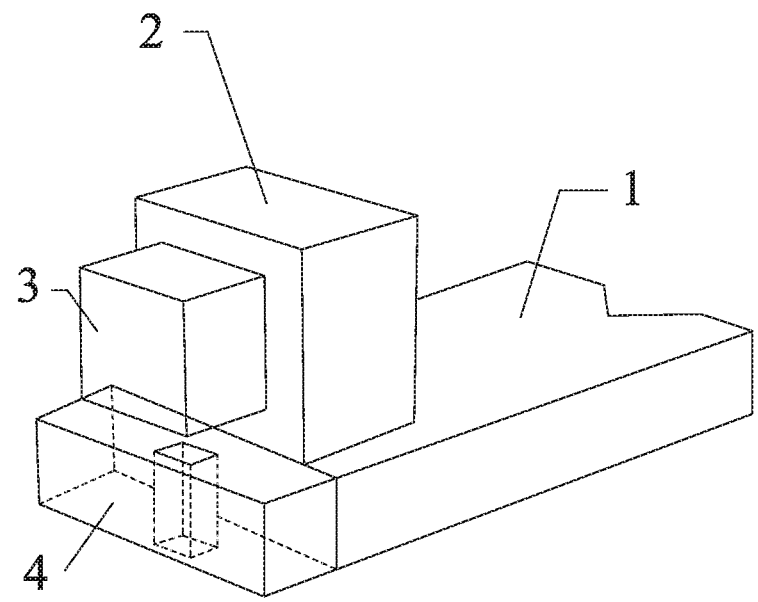
FIG. 1 is a schematic diagram of a thermally assisted magnetic recording head of the existing technology.
Figure 2:
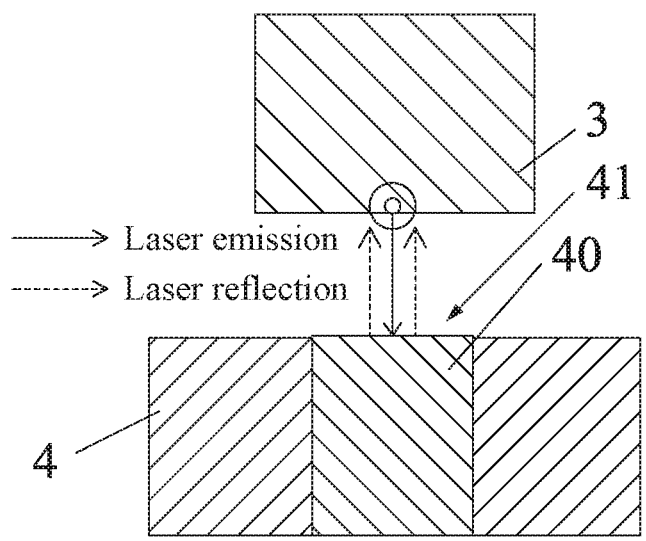
FIG. 2 is a schematic diagram showing a light incident surface of an optical waveguide of the thermally assisted magnetic recording head of the existing technology.

In order to have a clearer understanding of the technical characteristics, purposes and effects of the present application, the embodiments of the present application are described in detail with reference to the drawings.

Detailed descriptions of the embodiments of the thermally assisted magnetic recording head and the thermally assisted magnetic recording disk drive of the present application are described below. These embodiments are shown in the accompanying drawings, where from the beginning to the end, the same or similar reference numbers are used to denote the same or similar components having the same or similar functions.

In the description of the embodiments of the thermally assisted magnetic recording head and the thermally assisted magnetic recording disk drive of the present application, it is necessary to understand that the terms "front", "back", "upper", "lower", "top end", "bottom end", "upper portion", "lower portion" and other indications of orientation or position are based on the orientation or position of the devices or components shown in the drawings and are used for the purpose of describing the present application and simplifying the description, rather than indicating or implying that the devices or components must be in a specific orientation and have a specific construction or operation. Therefore, those terms cannot be considered as a limitation of the present application. In addition, the terms "first", "second", etc. are used for description purposes only and cannot be construed as indicative or suggestive of relative importance.

Figure 3:
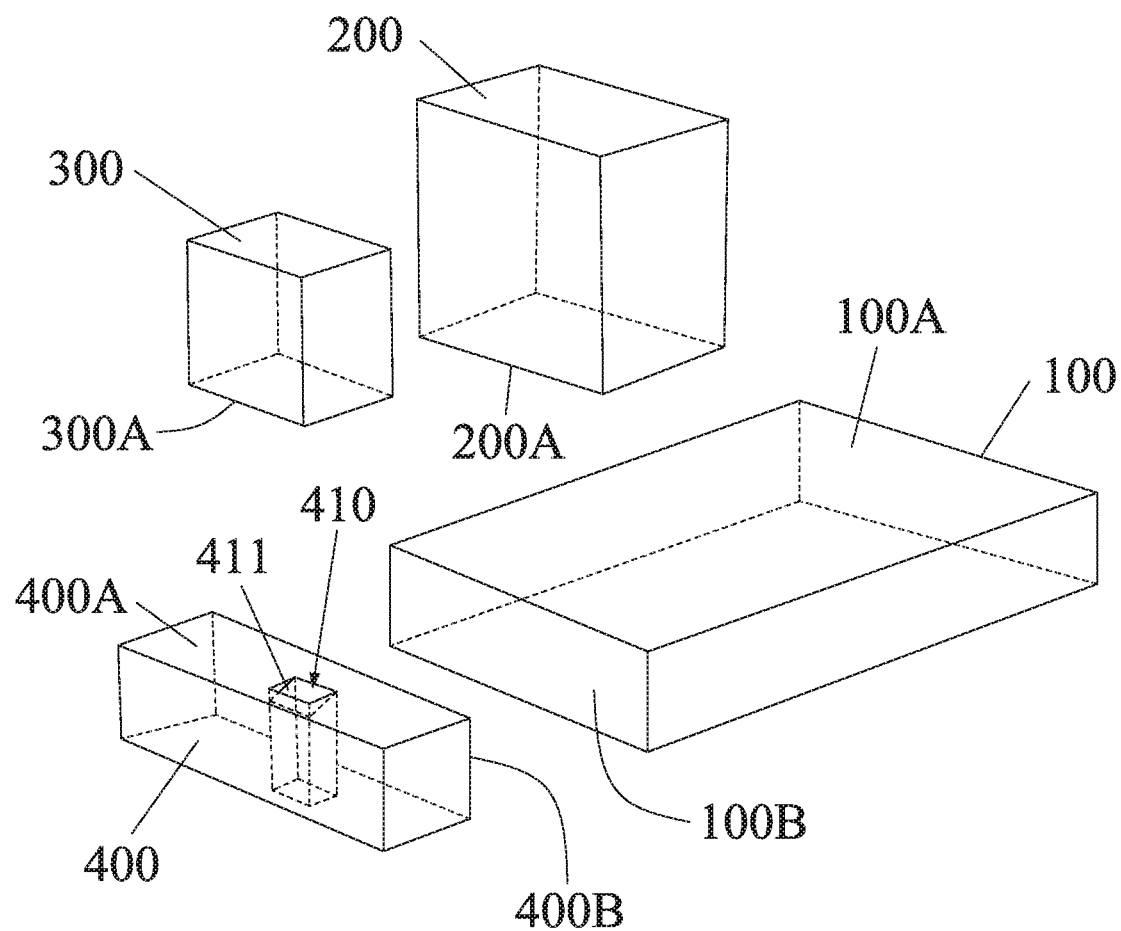
FIG. 3 is a schematic diagram of a thermally assisted magnetic recording head according to a first embodiment of the present application.
Figure 4:
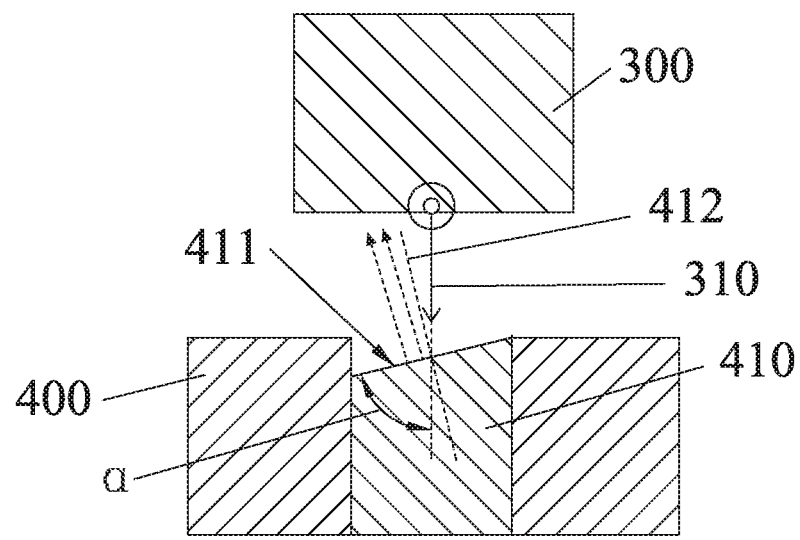
FIG. 4 is a schematic diagram showing a light incident surface of an optical waveguide of the thermally assisted magnetic recording head according to the first embodiment of the present application.

FIGS. 3 and 4 show the first embodiment of the thermally assisted magnetic recording head of the present application. In the embodiment, the thermally assisted magnetic recording head includes a slider body 100, a laser substrate 200, a laser 300 and a magnetic head 400. The laser substrate 200 is provided on the slider body 100. The laser 300 is provided on the laser substrate 200. The laser 300 can be a semiconductor laser for the generation of laser light. The magnetic head 400 is provided at a front end of the slider body 100, and the magnetic head 400 includes an optical waveguide 410 facing the laser 300. The angle α between a light incident surface 411 of the optical waveguide 410 and an incident direction 310 of a laser light incident on the optical waveguide 410 is less than 90 degrees. Since the light incident surface 411 is not perpendicular to the incident direction 310 of the laser light, even a portion of the laser light is reflected, the laser light reflected from the light incident surface will not go back to the laser along the incident route. This can prevent the issues of laser emission instability and mode hopping due to the return of laser light to the laser along the original incident route. The angle α between the light incident surface 411 and the incident direction 310 can be 45~87 degrees, preferably 82 degrees. Furthermore, referring to FIG. 3, a surface 200A of the laser substrate 200 contacting the slider body 100 and a surface 100A of the slider body 100 bearing the laser substrate 200 are both horizontal; a surface 400A, other than the light incident surface 411 of the optical waveguide 410, of the magnetic head 400 facing the laser 300 and a surface 300A of the laser 300 facing the magnetic head 400 are both horizontal; and a surface 400B of the magnetic head 400 facing the slider body 100 and a surface 100B of the slider body 100 facing the magnetic head 400 are both vertical.

Figure 5:
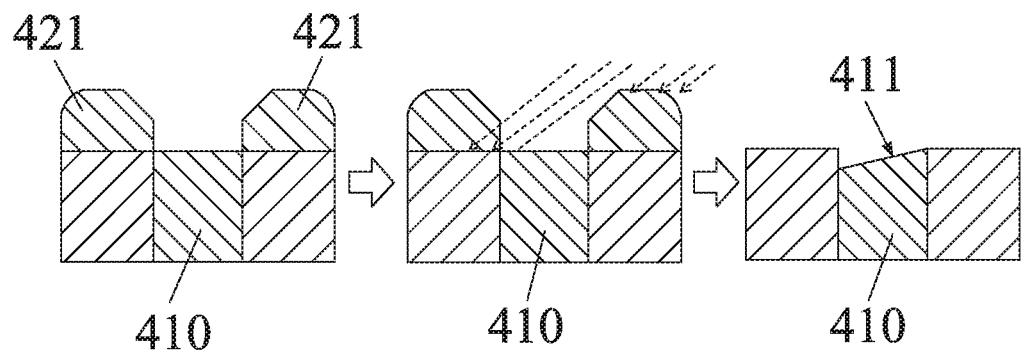
FIG. 5 is a schematic diagram of the process of forming the light incident surface of the optical waveguide of the thermally assisted magnetic recording head according to the first embodiment of the present application.

Referring to FIG. 5, the light incident surface 411 of the optical waveguide 410 may be formed by ion beam etching. Specifically, an end face of a cladding of the optical waveguide 410 is provided with photoresist 421. Then, ion beam etching is performed. After the ion beam etching is completed, a titled light incident surface 411 is formed. Of course, the light incident surface 411 may also be formed mechanical lapping, and is not limited to ion beam etching.

In the embodiment shown in FIG. 3, a normal line 412 of the light incident surface 411 of the optical waveguide 410 is tilted forwards relative to the incident direction 310.

Figure 6:
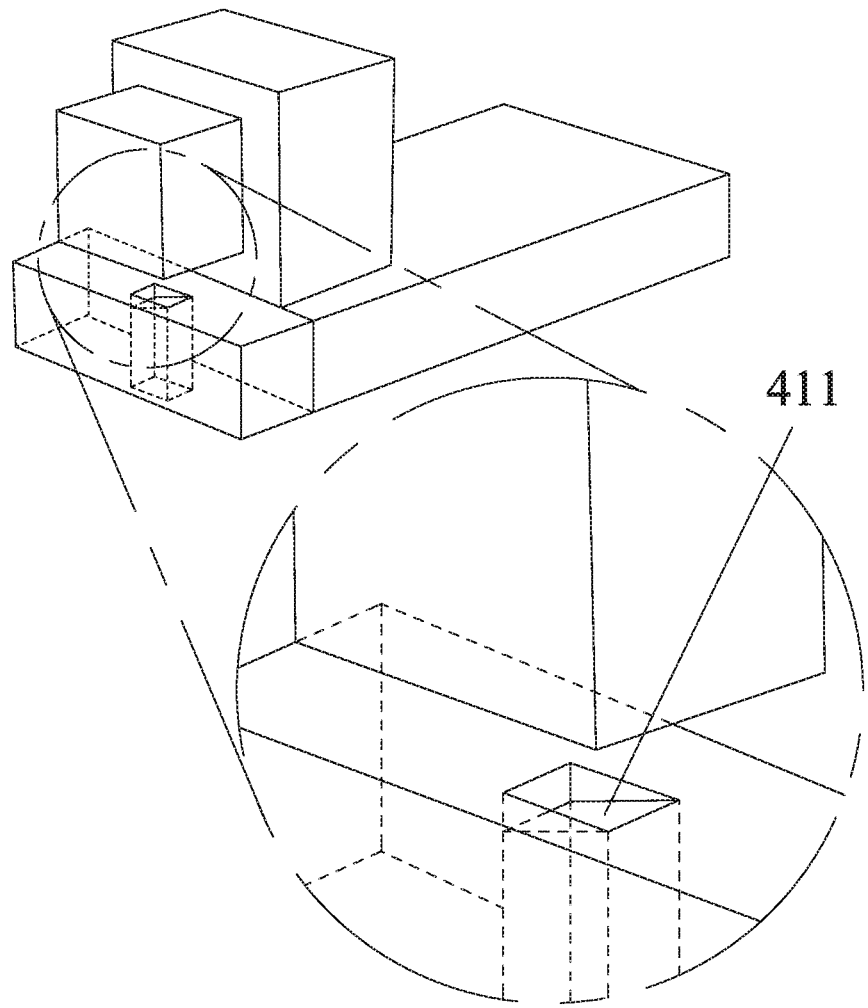
FIG. 6 is a schematic diagram of the thermally assisted magnetic recording head according to a second embodiment of the present application.

In the embodiment shown in FIG. 6, the normal line of the light incident surface 411 of the optical waveguide 410 is tilted leftwards relative to the incident direction 310.

Figure 7:
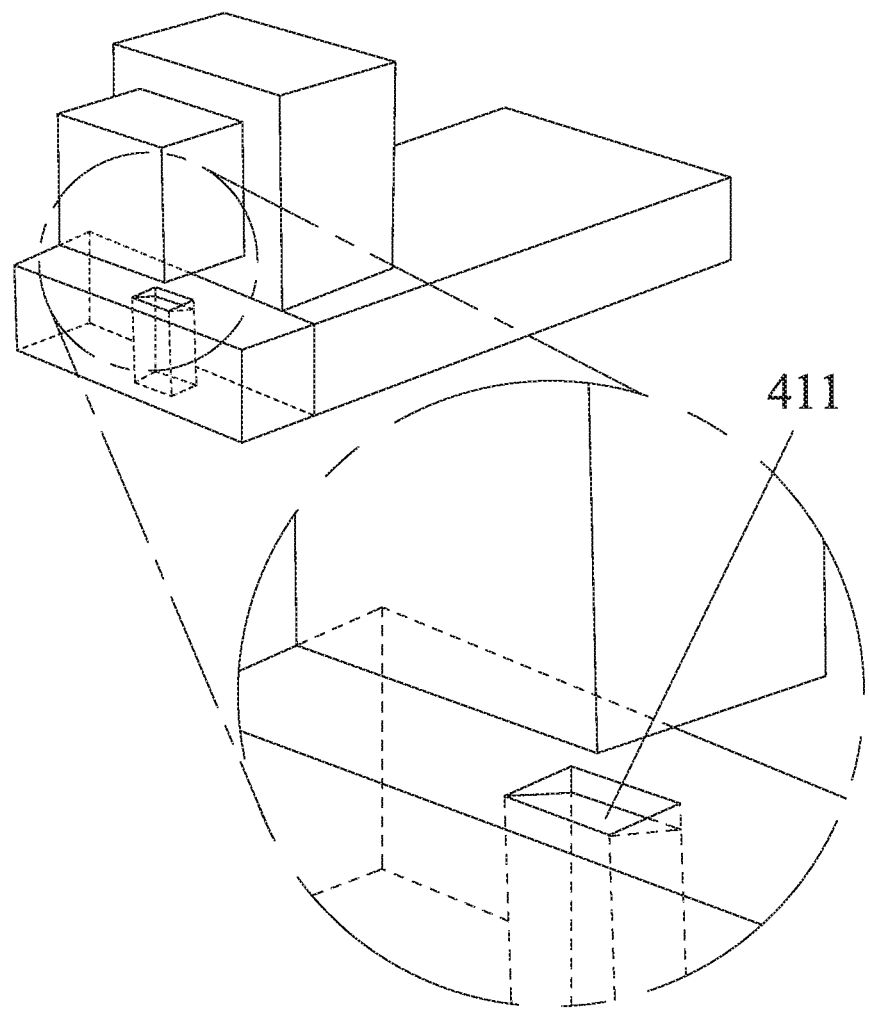
FIG. 7 is a schematic diagram of the thermally assisted magnetic recording head according to a third embodiment of the present application.

In the embodiment shown in FIG. 7, the normal line of the light incident surface 411 of the optical waveguide 410 is tilted backwards relative to the incident direction 310.

Figure 8:
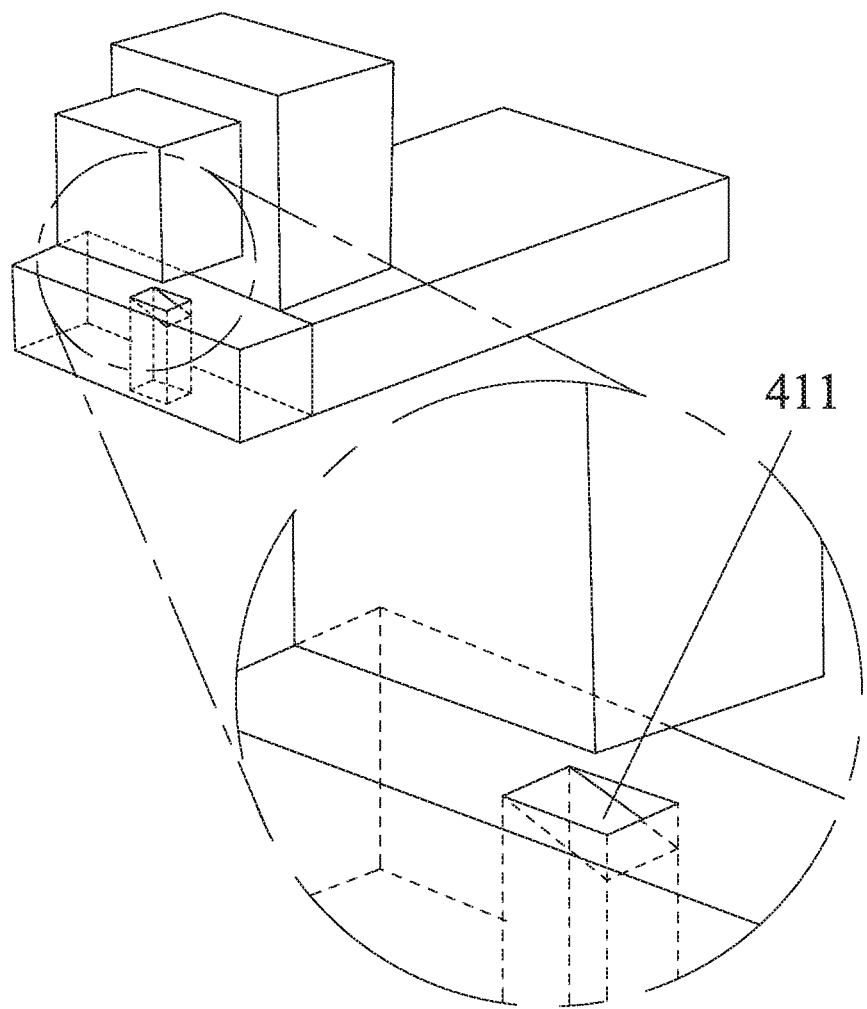
FIG. 8 is a schematic diagram of the thermally assisted magnetic recording head according to a fourth embodiment of the present application.

In the embodiment shown in FIG. 8, the normal line of the light incident surface 411 of the optical waveguide 410 is tilted rightwards relative to the incident direction 310.

Figure 9:
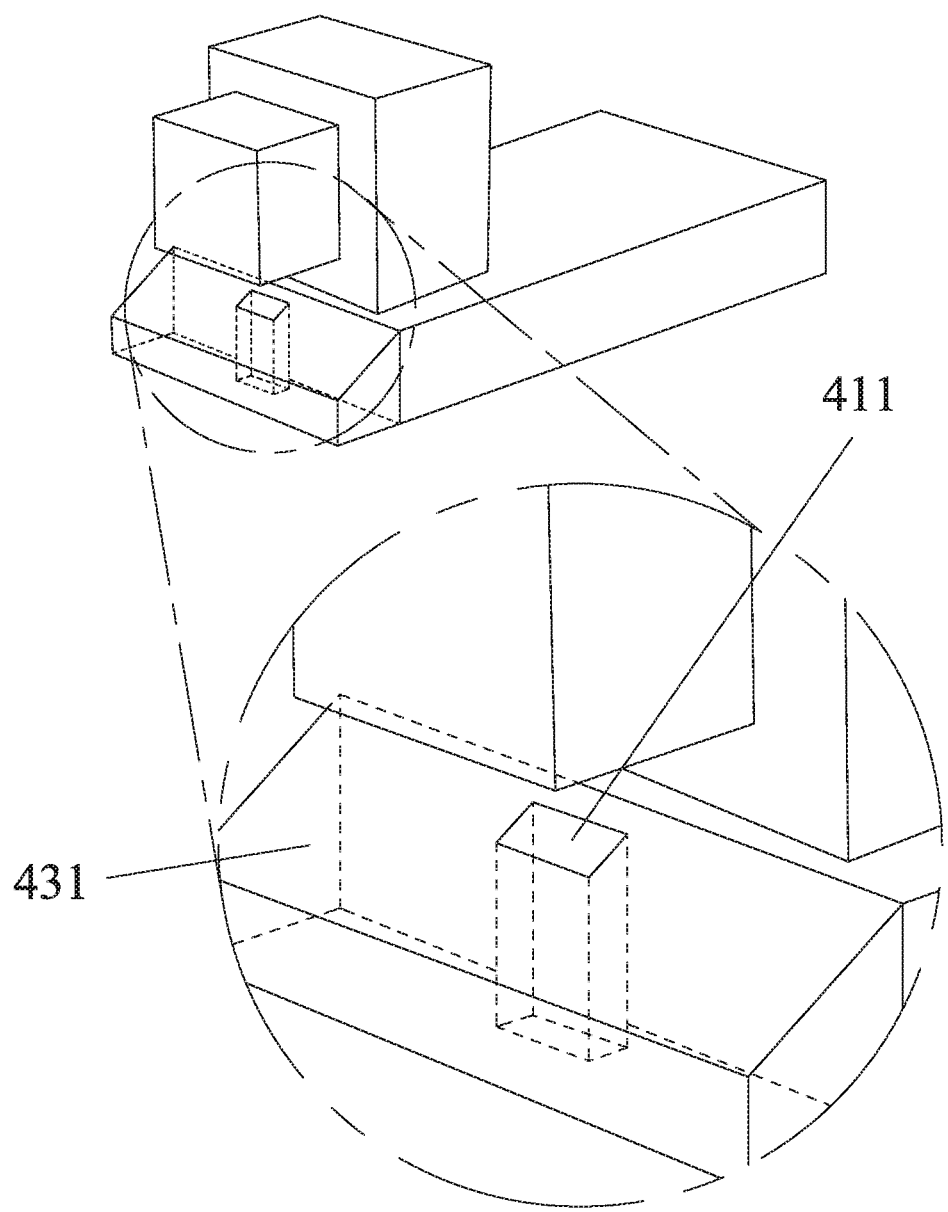
FIG. 9 is a schematic diagram of the thermally assisted magnetic recording head according to a fifth embodiment of the present application.
Figure 10:
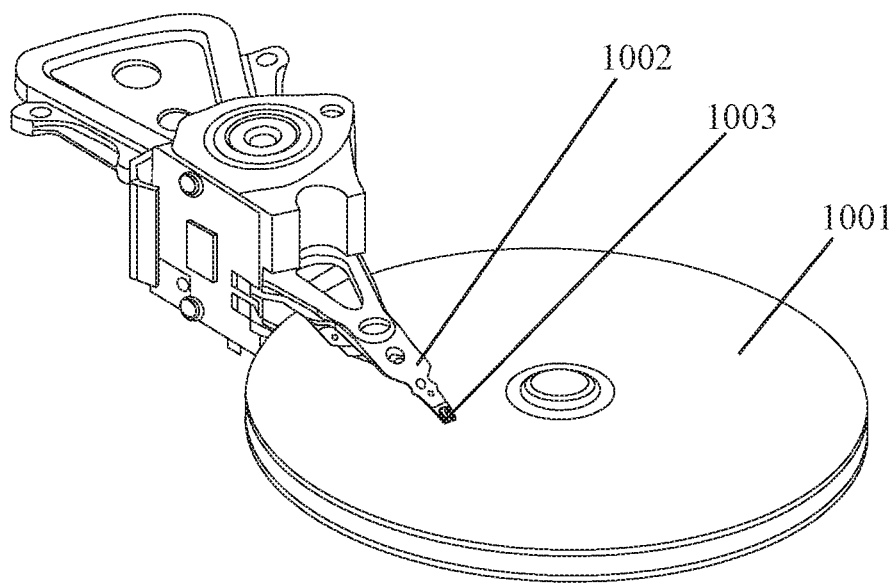
FIG. 10 is a schematic diagram of a thermally assisted magnetic recording disk drive according to an embodiment of the present application.

In the embodiment shown in FIG. 9, the light incident surface 411 of the optical waveguide 410 and an end face 431 of a cladding of the optical waveguide 410 are disposed on a same plane.

The present application also provides a thermally assisted magnetic recording disk drive 1000 having a plurality of magnetic disks 1001 and a magnetic head suspending arm 1002. A front end of the magnetic head suspending arm 1002 is provided with the thermally assisted magnetic recording heads 1003 mentioned above.

The embodiments of the present application are described in conjunction with the accompanying drawings. However, the present application is not limited to the specific embodiments mentioned above. The above-mentioned specific embodiments are only indicative and not restrictive. A technical person of ordinary skill in the art under the inspiration of the present application, without departing from the object of the present application and the scope of protection defined by the claims, may come up with many forms which fall within the protection of the present application.

What is claimed is:

1. A thermally assisted magnetic recording head, comprising a slider body, a laser substrate, a laser and a magnetic head, wherein the laser substrate is provided on the slider body, the laser is provided on the laser substrate, the magnetic head is provided at a front end of the slider body, the magnetic head comprises an optical waveguide facing the laser, and an angle between a tilted light incident surface of the optical waveguide and an incident direction of a laser light directly incident on the optical waveguide is less than 90 degrees;
- wherein a surface of the laser substrate contacting the slider body and a surface of the slider body bearing the laser substrate are both horizontal;
- a surface, other than the light incident surface of the optical waveguide, of the magnetic head facing the laser and a surface of the laser facing the magnetic head are both horizontal; and
- a surface of the magnetic head facing the slider body and a surface of the slider body facing the magnetic head are both vertical.

2. The thermally assisted magnetic recording head according to claim 1, wherein the angle between the light incident surface and the incident direction is 45~87 degrees.

3. A thermally assisted magnetic recording disk drive comprising a plurality of magnetic disks and a magnetic head suspending frame, wherein a front end of the magnetic head suspending frame is provided with the thermally assisted magnetic recording heads as claimed in claim 2.

4. The thermally assisted magnetic recording head according to claim 2, wherein the angle between the light incident surface and the incident direction is 82 degrees.

5. A thermally assisted magnetic recording disk drive comprising a plurality of magnetic disks and a magnetic head suspending frame, wherein a front end of the magnetic head suspending frame is provided with the thermally assisted magnetic recording heads as claimed in claim 4.

6. The thermally assisted magnetic recording head according to claim 1, wherein the light incident surface is formed by ion beam etching.

7. A thermally assisted magnetic recording disk drive comprising a plurality of magnetic disks and a magnetic head suspending frame, wherein a front end of the magnetic head suspending frame is provided with the thermally assisted magnetic recording heads as claimed in claim 6.

8. The thermally assisted magnetic recording head according to claim 1, wherein the light incident surface is formed by mechanical lapping.

9. A thermally assisted magnetic recording disk drive comprising a plurality of magnetic disks and a magnetic head suspending frame, wherein a front end of the magnetic head suspending frame is provided with the thermally assisted magnetic recording heads as claimed in claim 8.

10. The thermally assisted magnetic recording head according to claim 1, wherein the light incident surface and an end face of a cladding of the optical waveguide are disposed on a same plane.

11. A thermally assisted magnetic recording disk drive comprising a plurality of magnetic disks and a magnetic head suspending frame, wherein a front end of the magnetic head suspending frame is provided with the thermally assisted magnetic recording heads as claimed in claim 10.

12. The thermally assisted magnetic recording head according to claim 1, wherein a normal direction of the light incident surface is tilted forwards, backwards, leftwards, or rightwards relative to the incident direction.

13. A thermally assisted magnetic recording disk drive comprising a plurality of magnetic disks and a magnetic head suspending frame, wherein a front end of the magnetic head suspending frame is provided with the thermally assisted magnetic recording heads as claimed in claim 12.

14. A thermally assisted magnetic recording disk drive comprising a plurality of magnetic disks and a magnetic head suspending frame, wherein a front end of the magnetic head suspending frame is provided with the thermally assisted magnetic recording heads as claimed in claim 1.

* * * * *